(12) United States Patent
Gemme et al.

(10) Patent No.: US 11,742,646 B2
(45) Date of Patent: Aug. 29, 2023

(54) AERIAL SEGMENTED VIRTUAL CONDUIT

(71) Applicant: CommScope Technologies LLC, Hickory, NC (US)

(72) Inventors: Christopher P. Gemme, Hickory, NC (US); Mark E. Alrutz, Taylorsville, NC (US)

(73) Assignee: CommScope Technologies LLC, Hickory, NC (US)

( * ) Notice: Subject to any disclaimer, the term of this patent is extended or adjusted under 35 U.S.C. 154(b) by 221 days.

(21) Appl. No.: 17/346,231

(22) Filed: Jun. 12, 2021

(65) Prior Publication Data
US 2021/0399540 A1 Dec. 23, 2021

Related U.S. Application Data

(60) Provisional application No. 63/040,649, filed on Jun. 18, 2020.

(51) Int. Cl.
| | |
|---|---|
| *H02G 7/08* | (2006.01) |
| *H02G 7/12* | (2006.01) |
| *G02B 6/44* | (2006.01) |
| *G02B 6/48* | (2006.01) |

(52) U.S. Cl.
CPC ............. *H02G 7/08* (2013.01); *G02B 6/4439* (2013.01); *G02B 6/483* (2013.01); *H02G 7/12* (2013.01)

(58) Field of Classification Search
CPC . H02G 7/08; H02G 7/12; G02B 6/483; G02B 6/4439
See application file for complete search history.

(56) References Cited

U.S. PATENT DOCUMENTS

| | | | | |
|---|---|---|---|---|
| 5,411,443 A | * | 5/1995 | Meier | F16L 3/015 474/147 |
| 6,819,842 B1 | * | 11/2004 | Vogel | G02B 6/483 385/100 |
| 7,293,745 B2 | * | 11/2007 | Catapano | F16L 3/222 248/65 |
| 7,484,698 B2 | * | 2/2009 | Budagher | F16L 3/237 174/40 R |
| 8,439,316 B2 | * | 5/2013 | Feige | F16L 3/12 248/74.1 |
| 9,206,925 B2 | * | 12/2015 | Rouleau | F16L 3/123 |
| 9,855,696 B2 | * | 1/2018 | Morrow | H02G 7/05 |
| 10,286,207 B2 | * | 5/2019 | Black | A61B 5/4851 |
| 2007/0246616 A1 | * | 4/2007 | Budagher | F16L 3/237 174/40 R |

(Continued)

*Primary Examiner* — Bayan Salone
(74) *Attorney, Agent, or Firm* — Muncy, Geissler, Olds & Lowe, P.C.

(57) ABSTRACT

An aerial cable support system includes a first cable holder with a first tubular member and a second tubular member attached thereto. First and second elongated links are attached within first and second opposed openings of the first tubular member. A messenger wire is inserted through a sidewall of the second tubular member. At least one cable is either inserted through the sidewall of the second tubular member or through a sidewall of a third tubular member attached to the first and/or second tubular members. By attaching a series of cable holders together using a series of elongated links, a virtual conduit system is created to push cable(s) along a messenger wire between two poles and to support the cables from the messenger wire.

19 Claims, 12 Drawing Sheets

(56) References Cited

U.S. PATENT DOCUMENTS

2009/0230256 A1* 9/2009 Widlacki ............... F16L 3/222
                                                   248/68.1
2011/0226913 A1* 9/2011 Feige .................... F16L 3/12
                                                   248/74.1

* cited by examiner

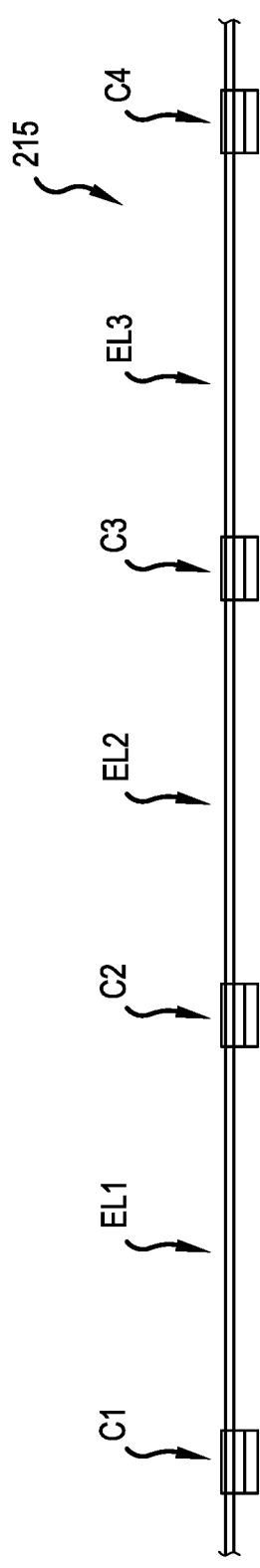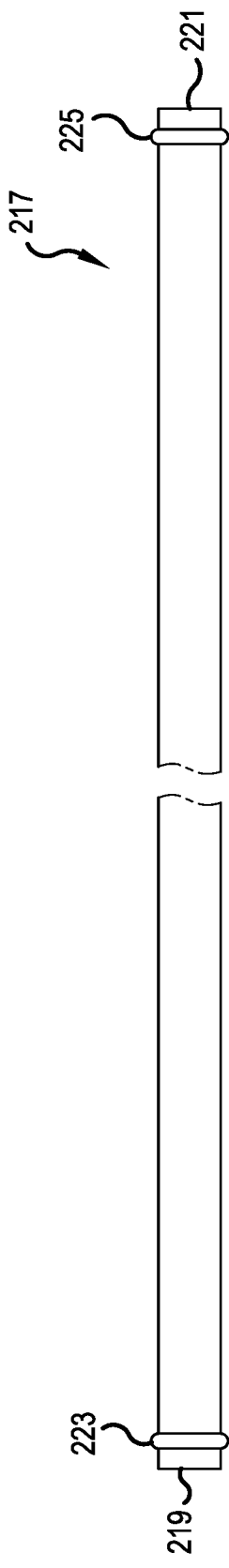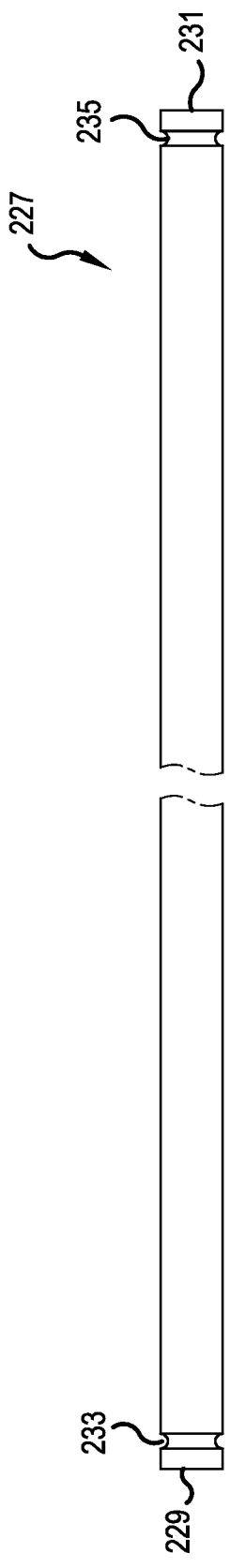

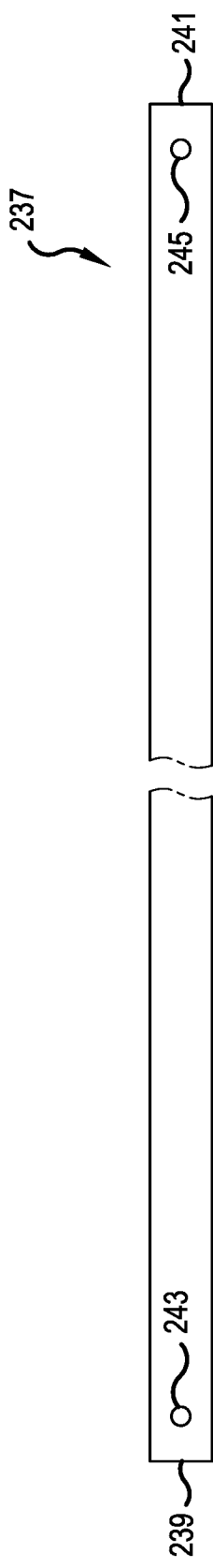
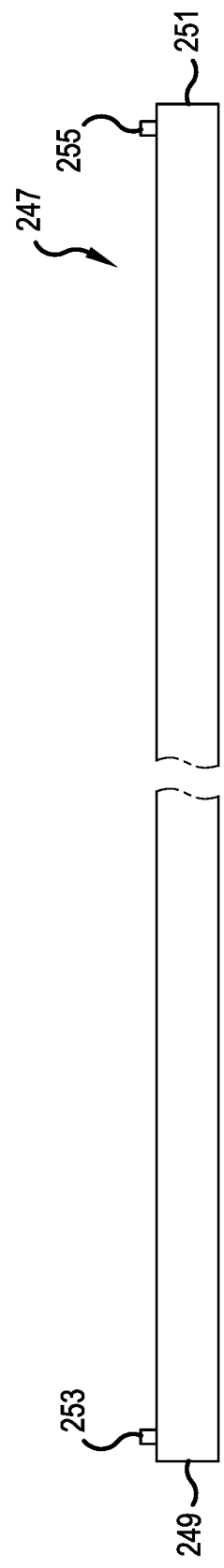
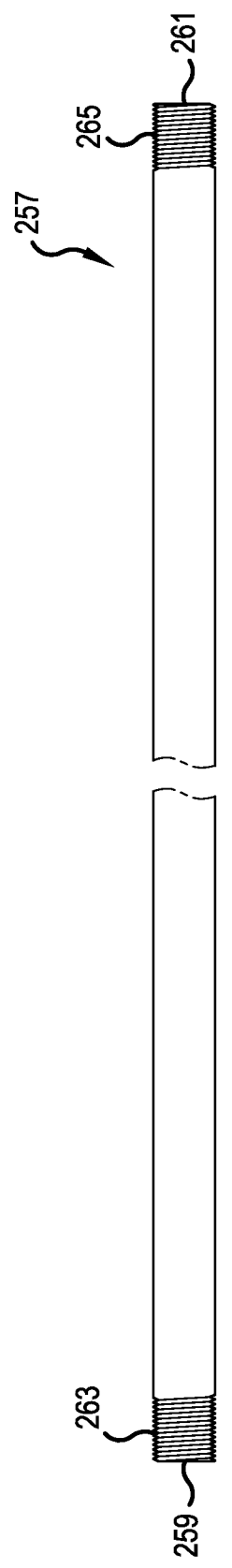

AERIAL SEGMENTED VIRTUAL CONDUIT

This application claims the benefit of U.S. Provisional Application No. 63/040,649, filed Jun. 18, 2020, which is herein incorporated by reference.

BACKGROUND OF THE INVENTION

1. Field of the Invention

The present invention relates to a cable holder. More particularly, an overhead cable support system includes plural cable holders, which may be deployed in a spaced apart series to act as a virtual conduit to suspend one or more cables from an overhead, stranded, suspension cable, e.g., a messenger wire.

2. Description of the Related Art

Overhead or suspended conduits are known in the prior art. For example, FIG. 1 is a perspective view of section of a typical overhead conduit 11, and FIG. 2 is a cross sectional view taken along line II-II in FIG. 1.

Typical overhead conduit 11 includes a steel stranded messenger wire 13 embedded in a polymer coating 15. A polymer web 17 has an upper end integrally formed with the coating 15 surrounding the messenger wire 13. The opposite end of the web 17 is integrally formed with a polymer forming a duct 19. Instead of the web 17, the duct 19 may be lashed to the messenger wire 13 by a metal or polymer wire or wires, or attached to the messenger wire 13 by an extruded jacket over the messenger wire 13 and duct 19, as shown in the present Assignee's U.S. Pat. No. 9,855,696, which is herein incorporated by reference.

The duct 19 forms a path for cables 18, such as coaxial cables, twisted pair cables, power/control cables and/or fiber optic cables. In particular, the duct 19 protects the cables 18 from moisture and other hazards in the environment, e.g. UV sun rays, contact with sharp objects, damage from insects/rodents/birds. The cables 18 are typically installed in the duct 19 by pulling or blowing the cables 18 through the installed overhead conduit 11, although the cables 18 can be provided in the duct 19 prior to installing the overhead conduit 11.

FIG. 3 is a view of an overhead cable system 21 in a remote wilderness area, which includes a ravine 25. The cable system 21 includes a plurality of poles 23-1, 23-2, 23-3 and 23-4 for supporting a cable unit 24. The overhead conduit 11 of FIGS. 1-2 is not particularly well-suited for the ravine 25 depicted in FIG. 3. The overhead conduit 11 is suitable for the span length between poles 23-1 and 23-2, and the span length between poles 23-3 and 23-4. However, the overhead conduit 11 is not well suited for the span length between poles 23-2 and 23-3 over the ravine 25.

The plastic used to form the duct 19 adds significant weight, placing added strain on the poles 23-2 and 23-3, which means that much more expensive and robust structures must be used for poles 23-2 and 23-3, which is costly. Also, the sag in the duct 19 over the ravine 25 may cause the duct 19 to become filled with water. Even if weep holes are placed into the duct 19, dust and debris can migrate to the bottom of the sag over the ravine 25 and block the drainage of water out of the weep holes. Water can freeze, crushing the cables 18 inside the duct 19 and negatively impacting the quality of service for communication network customers.

Another known method of supporting cables 18 in aerial applications along poles is depicted in FIG. 4. In FIG. 4, steel lashing wires 27 are wound around the cables 18 and the messenger wire 13 to hold them together. In other words, the polymer coating 15, the polymer web 17 and the polymer duct 19 are replaced by one or more steel lashing wires 27 to attach the cables 18 to the messenger wire 13.

Another known method of supporting cables 18 in aerial applications along poles is depicted in FIG. 5. In FIG. 5, a spiral hanger 29 is made of a steel rod, coated with a polymer. The spiral hanger 29 is used to attach the cables 18 to the messenger wire 13. Like the overhead conduit 11 of FIGS. 1-2, the spiral hanger 29 is also heavy and adds considerable weight to the strand length between poles 23-2 and 23-3 in FIG. 3. Therefore, as discussed above, much more expensive and robust structures must be used for poles 23-2 and 23-3, which is costly.

Additional prior art can be found in the following references U.S. Pat. Nos. 5,411,443 and 7,293,745 and US Published Applications 2007/0246616 and 2011/0226913, each of which is herein incorporated by reference.

SUMMARY OF THE INVENTION

The Applicant has discovered drawbacks with the lightweight support system illustrated in the prior art of FIG. 4. Communication and power companies are being challenged by their insurance companies. There is a concern that a broken lashing wire 27, which can be a common occurrence, may become energized and create sparks. The sparks may fall to the ground below and may cause combustible materials, like dry grass, leaves and pine needles, to ignite and spread as a wildfire.

The telecommunication industry has long been challenged with the issue of broken steel lashing wires 27, in some instances caused by galvanic corrosion at contact points between the dissimilar metals of the messenger wire 13, lashing wire or wires 27, and a de-lashing clamp that connects those two components where the lashing wire 27 stops or is repaired. Power is often times also transmitted over the telecommunication cables, e.g., a 90 volt signal over a coaxial cable used to power intermediate signal amplifiers which are located along the communication cable at intervals within the wilderness area.

One solution would be to provide lashing wires 27 formed of a non-conductive polymer instead of a conductive metal. However, polymers have problems such as abrasion and UV exposure causing excessive breakage of the lashing wire 27. Also, the polymer is more likely to break during the lashing process when the cables 18 are attached to the messenger wire 13.

Moreover, any lashing system in general does not allow for easy upgrading of the communication system. It is very expensive to install the cable length between poles 23-2 and 23-3. In some cases, a helicopter is used to suspend the lashed, cables 18 and messenger wire 13. Once installed, there is no way to add a cable 18 or replace a cable 18 within the lashing wires 27.

Therefore, the Applicant has devised a new system of attaching the cables 18 to the messenger wire 13, which has the benefits of the conduit system of FIGS. 1-2, but does not suffer the weight disadvantages. With the new system, the messenger wire 13 may be installed in the traditional manner, e.g., by helicopter if necessary. Once installed one or more cables 18 may be added or removed to the messenger wire 13 by a process, which may be accomplished from a stationary point at one of the poles 23-2 or 23-3.

Hence, the new method solves multiple issues that are associated with aerial communication networks of the prior art. An aerial segmented virtual conduit includes a series of cable holders. Each cable holder includes two, three or more interconnected polymer tubes, extending in a horizontal fashion as a singular piece, where the top most tube is a connection rod receiver. The middle tube is designed to accept the messenger wire 13. The bottom tube is designed to accept a communications cable 18 or plurality of cables 18.

Cable holders are joined together with connecting rods to keep the cable holders evenly spaced and prevent them from moving along the messenger wire 13 and the communication cable(s) 18. The tubes may be any given diameter necessary to facilitate the acceptance of the messenger wire 13 and the cable(s) 18. In an alternative embodiment, the middle tube and the bottom cable tube may be combined to a singular tube that accepts both the messenger cable 13 and the cable(s) 18.

The connecting rods may be adjoined to the cable holders and resist separation from the cable holders by utilizing an annular interlock/snap engagement, screw thread, a bayonet mount, a spring clip, or any other known method of connection. The second tube and the third tube may permit the messenger wire 13 and cable(s) 18 to be placed inside of them using a springform overlap function integral to each individual tube, a clip mechanism integral to each individual tube, and/or one or more of the tubes may separate into halves and then be locked together around the messenger wire 13 and the cable(s) 18. Of course, other known structures may also permit introduction of the messenger wire 13 and the cable(s) 18 into the second and/or third tubes.

In any of the designs, the tubes need not be round, but may take other shapes, such as square, rectangular, triangular, oval, etc. The cable holders may have a feature that provides for an identification plate to be attached or inserted.

One method of deploying the cable holders would be to place a first cable holder onto the messenger wire 13 near a supporting pole structure, e.g., pole 23-2. Next, place the cable(s) 18 inside of the same tube or a different tube of the first cable holder. Adjoin a first end of a first connecting rod to the first cable holder. Then, push the first cable holder out into the span of the messenger wire 13 toward the ravine 25 and toward the next supporting pole structure, e.g., pole 23-3, using the first connecting rod. Then, attach a second cable holder to the second end of the first connecting rod, and attach the second cable holder to the messenger wire 13 and cable(s) 18, as before. Attach a first end of a second connecting rod to the second cable holder. Then, use the second connecting rod to push the second cable holder toward the ravine 25 and toward the next supporting pole structure, e.g., pole 23-3, and continue the process with additional cable holders and connecting rods until the first cable holder reaches the next supporting pole structure, e.g., pole 23-3.

This method of supporting cables by a messenger wire 13 provides several benefits. It may be used without rebuilding an existing infrastructure or placed in new construction. It permits the removal of lashing wire(s) 27. It reduces the airfoil effect typically created by lashed cable(s) 18, which can create unwanted strain on the supporting pole structure. It can reduce strand gallop, where the aerial plant develops a large wave movement due to a resonance created by a particular wind speed and direction, which can be damaging to the supporting pole structures, the messenger wire 13, lashing wire 27, and the cable(s) 18. It can reduce the potential damage to cable(s) 18 that can occur during the lashing process. It eliminates lashing wires 27 that may break and be a potential cause for various liabilities and hazards to the public. It enables the harvesting of unused cable 18 from existing bundles lashed to the messenger wire 13, thus reducing loads on the supporting pole structures and adhering to joint user agreements with pole owners. In other words, a cable 18 may be cut and pulled back out of the virtual conduit system, which is not possible with the lashing system of FIG. 4. It permits fiber optic cables to be slack stored on a span. It enables placements of additional cable(s) 18 over time. If a segment becomes damaged, only the damaged segment needs to be replaced versus re-lashing an entire span or adding another delashing clamp, where the lashing wire 27 broke. It eliminates corrosion of the messenger wire 13 caused by the dissimilar metals used in the lashing wire 27 and de-lashing clamps. It provides a simple method of identification with the optional identification plates. It permits cables 18 to expand and contract more efficiently reducing the stress of thermal cycles. It eliminates the safety hazard posed to workers being severely scratched or subcutaneously poked by the ends of lashing wires 27.

These and other objects are addressed by an aerial cable support system which includes a first cable holder with a first tubular member and a second tubular member attached thereto. First and second elongated links are attached within first and second opposed openings of the first tubular member. A messenger wire is inserted through a sidewall of the second tubular member. At least one cable is either inserted through the sidewall of the second tubular member or through a sidewall of a third tubular member attached to the first and/or second tubular members. By attaching a series of cable holders together using a series of elongated links, a virtual conduit system is created to push cable(s) along a messenger wire between two poles and to support the cables from the messenger wire.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 15 is a diagram depicting four cable holders with elongated links connecting the cable holders to form an overhead cable support system;

FIG. 16 is a side view of an elongated link, in accordance with a first embodiment of the present invention;

FIG. 17 is a side view of an elongated link, in accordance with a second embodiment of the present invention;

FIG. 18 is a side view of an elongated link, in accordance with a third embodiment of the present invention;

FIG. 19 is a side view of an elongated link, in accordance with a fourth embodiment of the present invention;

FIG. 20 is a side view of an elongated link, in accordance with a fifth embodiment of the present invention;

DETAILED DESCRIPTION OF EMBODIMENTS OF THE INVENTION

Figure 1:
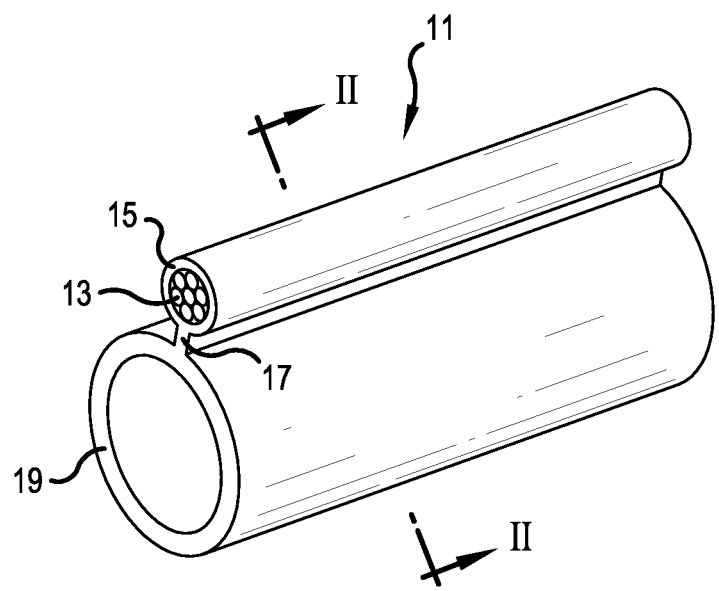
FIG. 1 is a perspective view of an overhead conduit, in accordance with the prior art.
Figure 2:
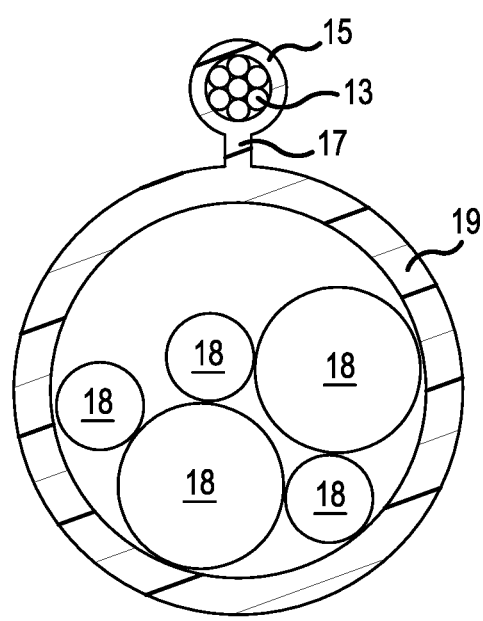
FIG. 2 is a cross sectional view taken along line II-II in FIG. 1.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 6:
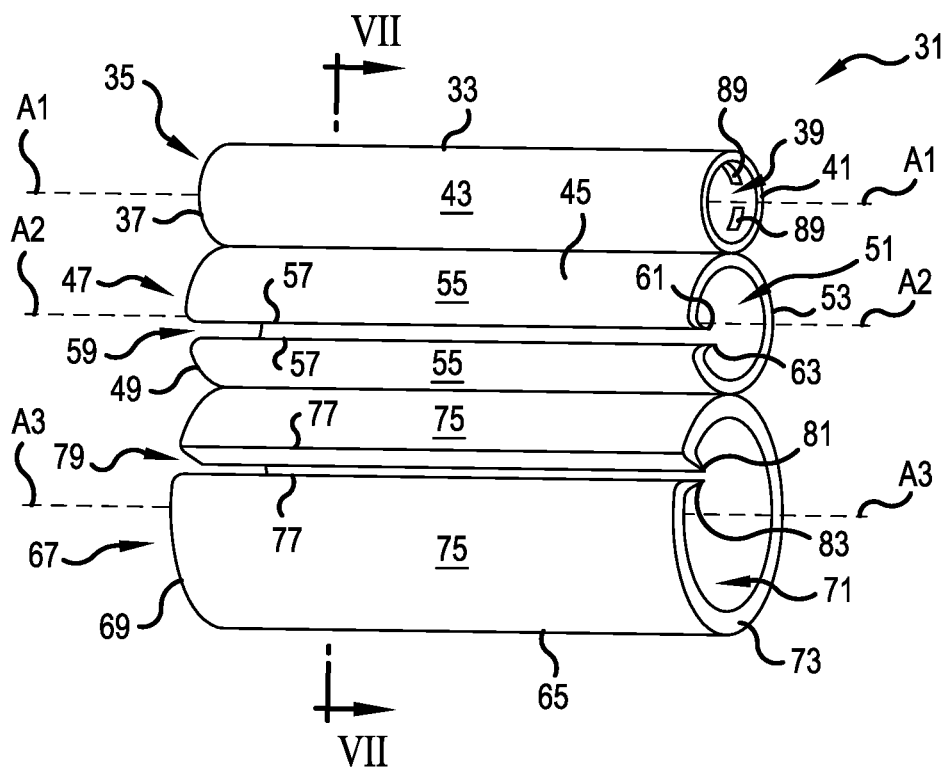
FIG. 6 is a perspective view of a cable holder, in accordance with a first embodiment of the present invention.
Figure 7:
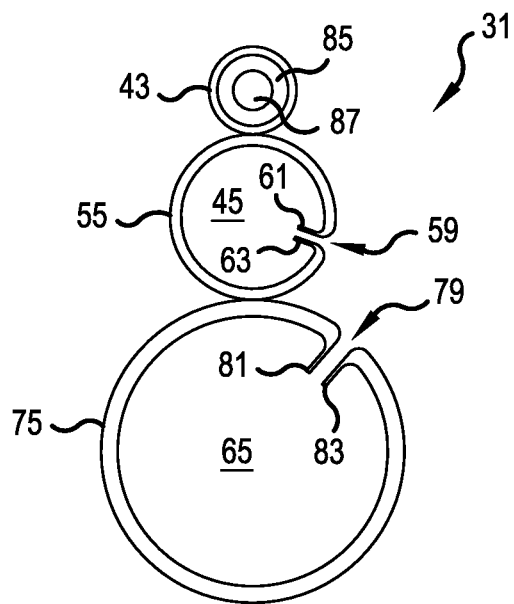
FIG. 7 is a cross sectional view taken along line VII-VII in FIG. 6.

A cable support system in accordance with the present invention includes a cable holder. FIG. 6 is a perspective view of the cable holder 31, in accordance with a first embodiment of the present invention, whereas FIG. 7 is a cross sectional view taken along line VII-VII in FIG. 6.

The cable holder 31 includes a first tubular member 33, which generally extends along a first axis A1. The first tubular member 33 includes a first opening 35 at a first end 37 of the first tubular member 33. A second opening 39 is provided on a second end 41 of the first tubular member 33, opposite to the first end 37 of the first tubular member 33. The first tubular member 33 includes a first sidewall 43.

The cable holder 31 also includes a second tubular member 45, which generally extends along a second axis A2, wherein the second axis A2 is generally parallel to the first axis A1. The second tubular member 45 includes a first opening 47 at a first end 49 of the second tubular member 45. A second opening 51 is provided on a second end 53 of the second tubular member 45, opposite to the first end 49 of the second tubular member 45. The second tubular member 45 includes a second sidewall 55.

The second tubular member 45 is attached to the first tubular member 33. For example, the second sidewall 55 may be attached to the first sidewall 43 by at least one of a snap connection, fasteners, a molded connection, a welded connection or an adhesive connection. However, other forms of connection may be used such as one or more brackets or straps wrapped around the first and second tubular members 33 and 45.

The second sidewall 55 includes a first section 57 which is open, or may be opened. The first section 57 allows a cable to be inserted laterally into the second tubular member 45, as will be described in greater detail hereinafter. In the first embodiment of the cable holder 31, the second sidewall 55 is formed by a continuous curved wall which is shaped like a cylinder with a gap 59. The gap 59 is linear and connects the first opening 47 at the first end 49 of the second tubular member 45 to the second opening 51 at the second end 53 of the second tubular member 45. First and second inwardly protruding lips 61 and 63 are formed at the facing ends of the second sidewall 55 which form the gap 59, and the gap 59 remains continuously open.

The cable holder 31 also includes a third tubular member 65, which generally extends along a third axis A3, wherein the third axis A3 is generally parallel to the first axis A1 and the second axis A2. The third tubular member 65 includes a first opening 67 at a first end 69 of the third tubular member 65. A second opening 71 is provided on a second end 73 of the third tubular member 65, opposite to the first end 69 of the third tubular member 65. The third tubular member 65 includes a third sidewall 75.

The third tubular member 65 is attached to at least one of the first and second tubular members 33 and 45. For example, the third sidewall 75 may be attached to the second sidewall 55 by at least one of a snap connection, fasteners, a molded connection, a welded connection or an adhesive connection. However, other forms of connection may be used such as one or more brackets or straps wrapped around the first, second and third tubular members 33, 45 and 65.

The third sidewall 75 includes a second section 77, which is open, or may be opened. The second section 77 allows a cable to be inserted laterally into the third tubular member 65, as will be described in greater detail hereinafter. In the first embodiment of the cable holder 31, the third sidewall 75 is formed by a continuous curved wall which is shaped like a cylinder with a gap 79. The gap 79 connects the first opening 67 at the first end 69 of the third tubular member 65 to the second opening 71 at the second end 73 of the third tubular member 65. Third and fourth inwardly protruding lips 81 and 83 are formed at the facing ends of the third sidewall 75 which form the gap 79, and the gap 79 remains continuously open.

The first and second lips 61 and 63 protrude inwardly into the second tubular member 45, as best seen in the cross sectional view of FIG. 7. Likewise, the third and fourth lips 81 and 83 protrude inwardly into the third tubular member 65. The first, second, third and fourth lips 61, 63, 81 and 83 and at least the portions of the second and third sidewalls 55 and 75 adjacent to the first, second, third and fourth lips 61, 63, 81 and 83 are formed of a resilient material, which allows flexure when a manual force is applied thereto.

In operation, the messenger wire 13 of the prior art, is placed alongside the gap 59 of the second tubular member 45. Pressure is applied to force the messenger wire 13 into the gap 59, which opens the gap 59 until the messenger wire 13 snaps into the interior of the second tubular member 45. Once inside, the second tubular member 45, the resilient material forming the first and second lips 61 and 63 and other portions of the second sidewall 55 causes the gap 59 to resume its initial size and shape, thereby capturing the messenger wire 13 within the second tubular member 45.

In operation, the cables 18 of the prior art, are placed alongside the gap 79 of the third tubular member 65. Pressure is applied to force the cables 18 into the gap 79, which opens the gap 79 until the cables 18 snap, one at a time or in sets, into the interior of the third tubular member 65. Once inside the third tubular member 65, the resilient material forming the third and fourth lips 81 and 83 and other portions of the third sidewall 75 causes the gap 79 to resume its initial size and shape, thus capturing the cable or cables 18 within the third tubular member 65.

As best seen in FIG. 7, a stop wall 85 may optionally be located near a middle of the first tubular member 33. The stop wall 85 may optionally include a central through hole 87. Further, the inner surface of the first sidewall 43 near the first and second ends 37 and 41 may include first and second features 89, respectively. The first and second features 89 may be formed as a continuous annular recess, a series of recesses, a continuous annular protrusion, or a series of protrusions. The stop wall 85 and the first and second features 89 are intended to interact with first and second objects inserted into the first and second openings 35 and 39, respectively, to hold the first and second objects within the first and second openings 35 and 39, respectively, as will be further described hereinafter.

Figure 8:
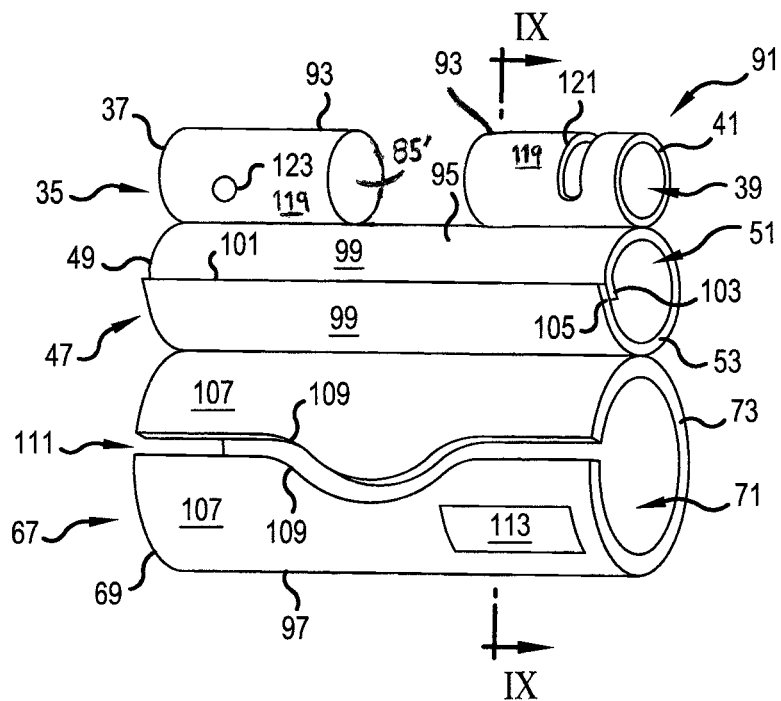
FIG. 8 is a perspective view of a cable holder, in accordance with a second embodiment of the present invention.
Figure 9:
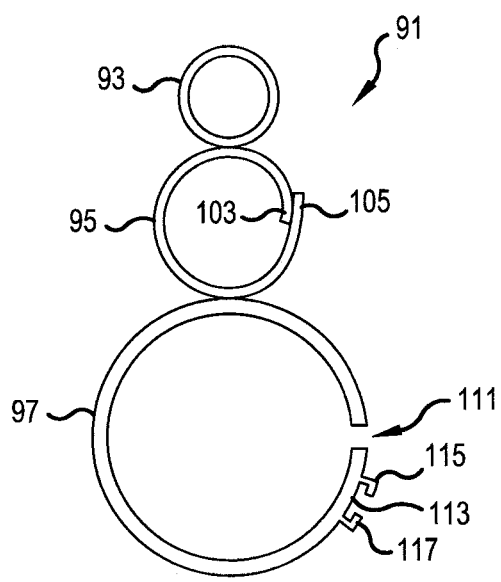
FIG. 9 is a cross sectional view taken along line IX-IX in FIG. 8.

FIG. 8 is a perspective view of the cable holder 91, in accordance with a second embodiment of the present invention, whereas FIG. 9 is a cross sectional view taken along line IX-IX in FIG. 8. The cable holder 91 includes a first tubular member 93, a second tubular member 95 and a third tubular member 97. The first tubular member 93 may be discontinuous. FIG. 8 show the first tubular member 93 with two sections, a first section with the first opening 35, and a second section with the second opening 35. The first and second sections may be closed off by an optional stop wall 85' opposite to the first and second openings 35 and 39.

The second tubular member 95 and the third tubular member 97 are generally formed the same as in the first embodiment of FIGS. 6 and 7 with a few exceptions. First, a second sidewall 99 of the second tubular member 95 includes a first section 101 which is normally closed. The first section 101 allows a cable to be inserted laterally into the second tubular member 95, as will be described in greater detail hereinafter. In the second embodiment of the cable holder 91, the second sidewall 99 is formed by a continuous curved wall 99, which is shaped like a cylinder with an overlap at the first section 101. The overlap is linear and connects the first opening 47 at the first end 49 of the second tubular member 95 to the second opening 51 at the second end 53 of the second tubular member 95. At the first section 101, first and second lips 103 and 105 are formed at the ends of the second sidewall 99. The second lip 105 overlies the first lip 103 to form an opening, which remains normally closed, except when a manual force is applied thereto. The overlap may be reversed, where the first lip 103 overlies the second lip 105.

In operation, the messenger wire 13 of the prior art, is placed alongside first section 101 of the second tubular member 95. Pressure is applied to the messenger wire 13, which moves the first lip 103 away from the second lip 105 until the messenger wire 13 snaps into the interior of the second tubular member 95. Once inside the second tubular member 45, the resilient material forming the first and second lips 103 and 105 and other portions of the second sidewall 99 causes the first section 101 to resume its initial size and shape, thereby capturing the messenger wire 13 within the second tubular member 95.

Second, a third sidewall 107 of the third tubular member 97 includes a second section 109. The second section 109 allows a cable to be inserted laterally into the third tubular member 97, as will be described in greater detail hereinafter. In the second embodiment of the cable holder 91, the third sidewall 107 is formed by a continuous curved wall which is shaped like a cylinder with a gap 111. The gap 111, which is normally open, connects the first opening 67 at the first end 69 of the third tubular member 95 to the second opening 71 at the second end 73 of the third tubular member 95. The gap 111 follows a serpentine or curved path from the first end 69 of the second tubular member 95 to the second end 73 of the second tubular member 95.

In operation, the cables 18 of the prior art, are placed alongside the gap 111 of the third tubular member 97. Manually, a curve is formed in the length of the cable or cables 18 to match the shape of the curve in the gap 111. The cable or cables 18 are then passed into the interior of the third tubular member 97. Once inside the third tubular member 65, the resilient nature of the cable or cables 18 causes the cables to straight out. The cables 18 cannot then pass back out of the gap 111. Hence, the gap 111 can be made to be slightly larger than the diameter of each cable 18 to be held therein, and the material used to form the third sidewall 107 can be made of a more stiff material, e.g., of a lower resilience than the material used to form the third sidewall 75 in FIGS. 6-7.

Third, a labeling area 113 is formed on the third tubular member 97. The labeling area 113 is dimensioned to accept and hold a label to identify a cable or cables 18 held within the third tubular member 97. As best seen in the cross sectional view of FIG. 9, the labeling area 113 may include upper and lower guide rails 115 and 117 to accept a slide-in label.

Fourth, the inner surface of a first sidewall 119 of the first tubular member 93 near the first and second ends 37 and 41 may include first and second features 123 and 121, respectively. The first feature 123 may be formed as aligned through holes on opposite sides of the first sidewall 119. The second feature 121 may be formed as a slot through the first sidewall 119. More preferably, the first and second features 123 and 121 may both be formed as aligned through holes, or both be formed as slots. FIG. 8 is merely intended to teach two different configurations. The first and second features 123 and 121 are intended to interact with first and second objects inserted into the first and second openings 35 and 39, respectively, to hold the first and second objects within the first and second openings 35 and 39, as will be further described hereinafter.

Figure 10:
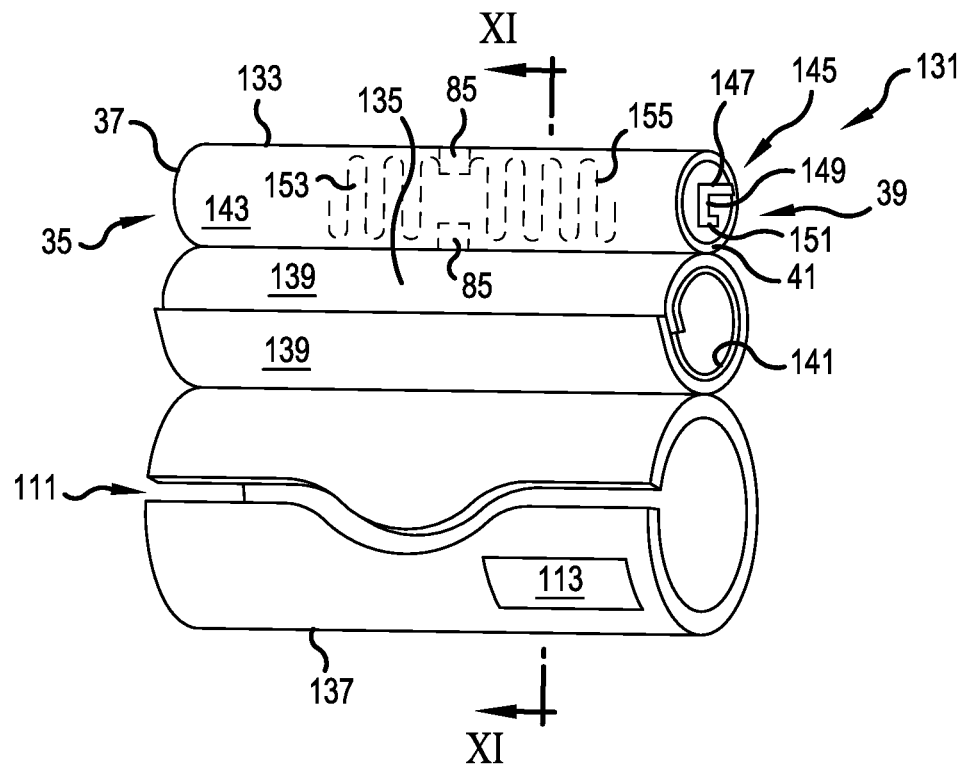
FIG. 10 is a perspective view of a cable holder, in accordance with a third embodiment of the present invention.
Figure 11:
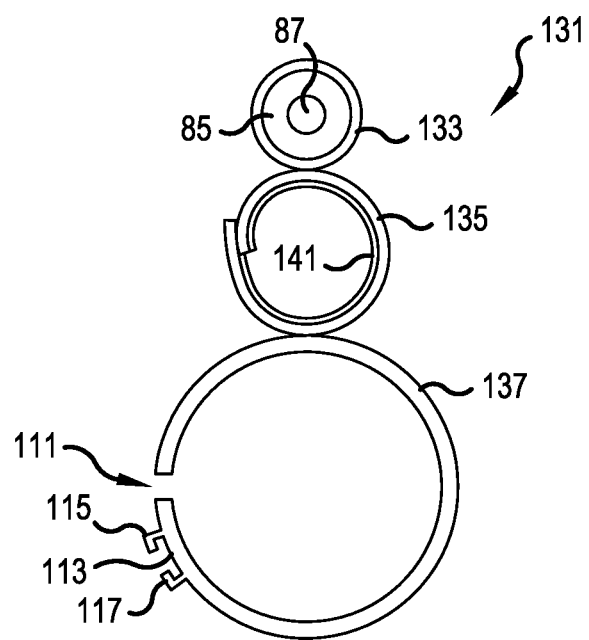
FIG. 11 is a cross sectional view taken along line XI-XI in FIG. 10.

FIG. 10 is a perspective view of the cable holder 131, in accordance with a third embodiment of the present invention, whereas FIG. 11 is a cross sectional view taken along line XI-XI in FIG. 10. The cable holder 131 includes a first tubular member 133, a second tubular member 135 and a third tubular member 137, which are generally formed the same as in the second embodiment of FIGS. 8 and 9 with a few exceptions.

First, a second sidewall 139 of the second tubular member 135 includes an inner surface 141. The inner surface 141 may be an additional molded layer, an impregnated surface, a sleeve or a spray. The inner surface 141 is formed of a material having a lower coefficient of friction than the material used to form the second sidewall 139, such as polytetrafluoroethylene.

In operation, the messenger wire 13 of the prior art, is placed into the interior of the second tubular member 135, as described in conjunction with the second embodiment. Once inside the second tubular member 135, the inner surface 141 contacts the messenger wire 13 and allows the messenger wire 13 to slide more easily with respect to the second sidewall 139.

Third, the inner surface of a first sidewall 143 of the first tubular member 133 near the first and second ends 37 and 41 may include first and second features 145. The first and second features 145 may both be formed as an entrance track 147, which leads to a travel track 149, which leads to a seating track 151. First and second springs 153 and 155 abut the stop wall 85 and extend toward the first and second openings 35 and 39 of the first tubular member 133, respectively. The first and second features 145 and first and second springs 153 and 155 are intended to interact with first and second objects inserted into the first and second openings 35 and 39, respectively, to hold the first and second objects within the first and second openings 35 and 39, respectively, in a bayonet mount style, as will be further described hereinafter.

Figure 12:
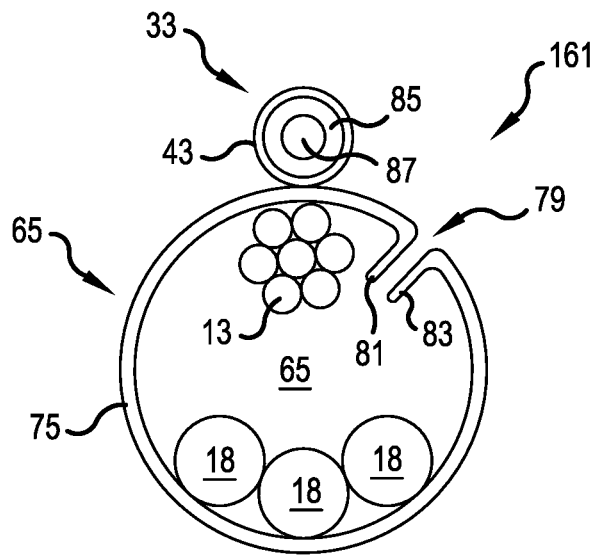
FIG. 12 is a cross sectional view of a cable holder, in accordance with a fourth embodiment of the present invention.

FIG. 12 is a cross sectional view of a cable holder 161, in accordance with a fourth embodiment of the present invention. The fourth embodiment is the same as the first embodiment of FIGS. 6 and 7 except, that there are only two tubular members. The first tubular member 33 with the first sidewall 43, and the third tubular member 65 with the third sidewall 75, wherein the third sidewall 75 is directly attached to the first sidewall 43. The third tubular member 65 may be considered a second tubular member, as the second tubular member 45 of FIGS. 6-7 is not present. In operation, the messenger wire 13 and the cables 18 are inserted into the third tubular member 65 through the gap 79 formed between the third and fourth lips 81 and 83 to reside within the third tubular member 65, as shown in FIG. 12.

Figure 13:
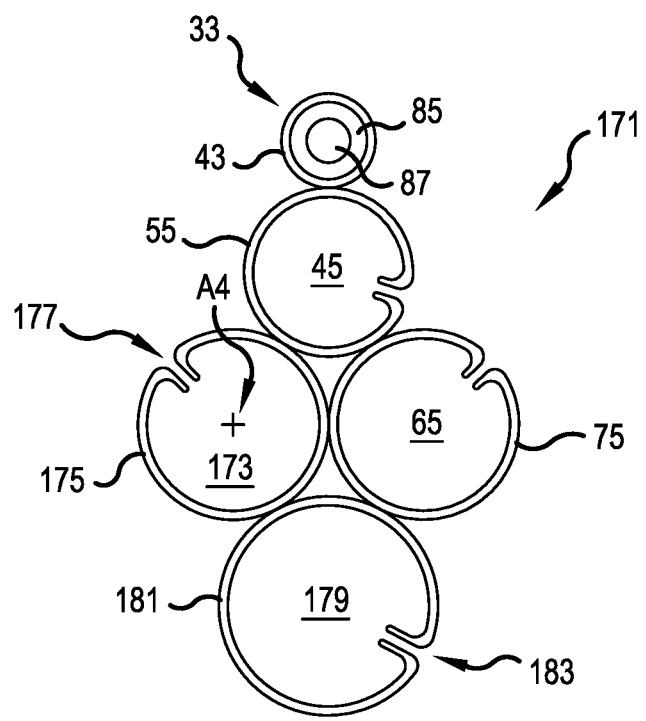
FIG. 13 is a cross sectional view of a cable holder, in accordance with a fifth embodiment of the present invention.

FIG. 13 is a cross sectional view of a cable holder 171, in accordance with a fifth embodiment of the present invention. The fifth embodiment is the same as in the first embodiment of FIGS. 6 and 7, except for the addition of more tubular members.

For example, the cable holder 171 includes a fourth tubular member 173, which generally extends along a fourth axis A4. Like the third tubular member 65, the fourth tubular member 173 includes a first opening at a first end of the fourth tubular 173 member and a second opening on a second end of the fourth tubular member 173, opposite to the first end of the fourth tubular member 173. The fourth tubular member 173 includes a fourth sidewall 175.

The fourth tubular member 173 is attached to at least one of the first, second and third tubular members 33, 45, and 65, and the fourth axis A4 is generally parallel to the first axis A1, the second axis A2 and the third axis A3. For example, the fourth sidewall 175 is attached to both the second sidewall 55 and the third sidewall 75. The fourth sidewall 175 includes a third section 177 which is open, or may be opened, to insert a cable 18 laterally into the fourth tubular member 173 through the third section 177.

FIG. 13 also shows a fifth tubular member 179. A fifth sidewall 181 of the fifth tubular member 179 is attached to the third and fourth sidewalls 75 and 175. A fourth section 183 of the fifth tubular member 179 is open, or may be opened, to insert a cable 18 laterally into the fifth tubular member 179 through the fourth section 183. The arrangement of FIG. 13 allows cables 18 to separated from each other, by type, size, ruggedness, service provider, etc. for better organization and/or protection of the cables 18.

Figure 14:
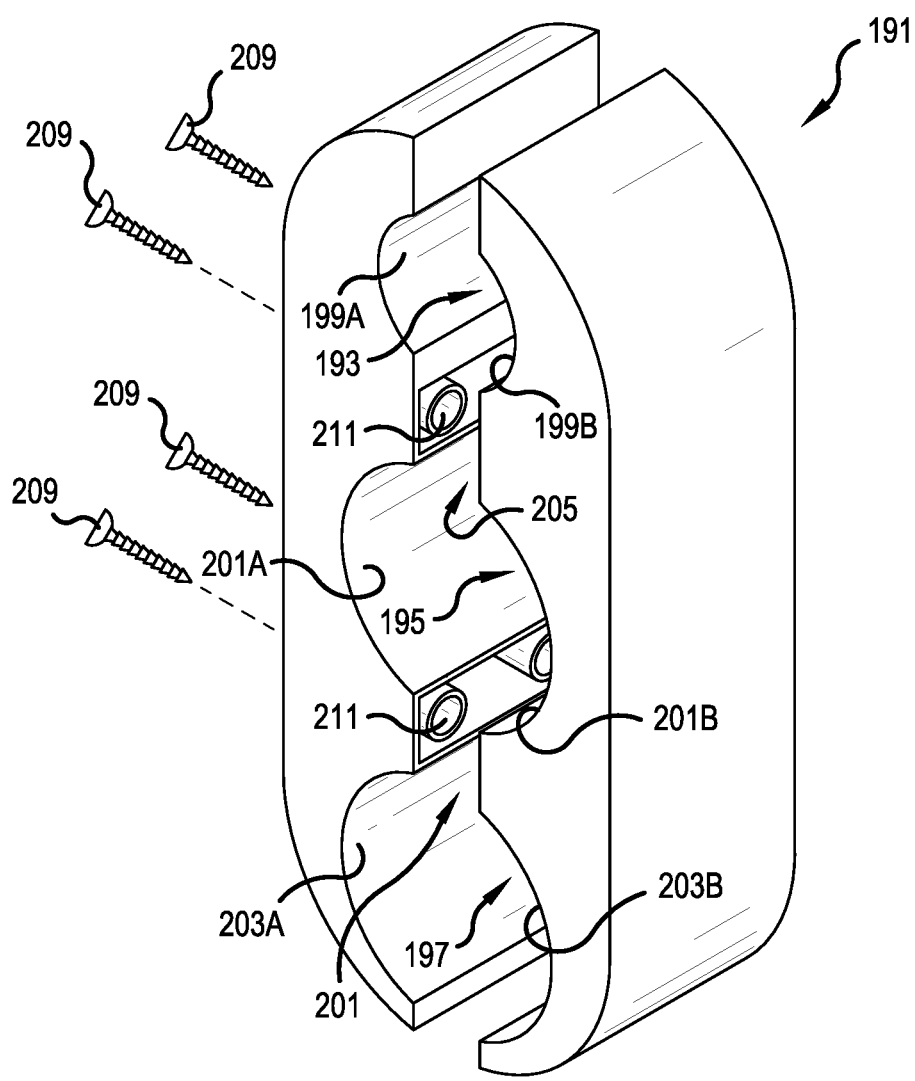
FIG. 14 is a perspective view of a cable holder, in accordance with a sixth embodiment of the present invention.

FIG. 14 is a perspective view of a cable holder 191, in accordance with a sixth embodiment of the present invention. The cable holder 191 includes a first tubular member 193, a second tubular member 195 and a third tubular member 197. The first, second and third tubular members 193, 195 and 197 are formed by first, second and third sidewalls 199, 201 and 203, respectively. Each of the first, second and third sidewalls 199, 201 and 203 is formed by two arcuate sidewall sections.

For example, the second sidewall 201 is formed by a first arcuate wall section 201A and a second arcuate wall section 201B so that first and second gaps 205 and 207 are formed between the first and second arcuate wall sections 201A and 201B. The gaps 205 and 207 may be closed by one or more fasteners 209, which pass through bore holes 211, adjacent to the first arcuate wall section 201A and engage into threaded holes adjacent to the second arcuate wall section 201B. Tightening the fasteners 209 pulls the first and second arcuate wall sections 201A and 201B into abutment to cause said second tubular member 195 to form a closed cylinder. This tightening of the fasteners 209 also simultaneously closes the first and third tubular members 193 and 197 into closed cylinders. Although screws have been shown as the fasteners, other types of fasteners may be used, like one or more locking clips or hasps.

FIG. 15 is a diagram depicting four cable holders C1, C2, C3 and C4 with three elongated links EL1, EL2 and EL3 connecting the cable holders C1, C2, C3 and C4 in a daisy-chain manner to form an overhead cable support system 215. In practice, the cable support system 215 might include fifty or even one hundred or more cable holders in a daisy-chain connection with fifty or one hundred or more elongated links. Each of the cable holders C1, C2, C3 and C4 may be constructed in accordance with one of the above embodiments of a cable holder 31, 91, 131, 161, 171 or 191. Each of the elongated links EL1, EL2 and EL3 may be constructed in accordance with one of the embodiments to be described below.

FIG. 16 is a side view of an elongated link 217, in accordance with a first embodiment of the present invention. The elongated link 217 is generally formed as a cylindrical rod with a first end 219 and an opposite, second end 221. A first protruding ring 223 is formed around a circumference of the cylindrical rod proximate the first end 219 of the elongated link 217. A second protruding ring 225 is formed around the circumference of the cylindrical rod proximate the second end 221 of the elongated link 217.

In operation, each of the elongated links EL1, EL2, EL3, etc. may be formed the same, and each of the cable holder C1, C2, C3, C4, etc. may be formed the same. Assuming the cable holders are formed in accordance with the first embodiment of the FIGS. 6-7, the first elongated link EL1 may constitute the first object to be inserted into the first opening 35 of the first tubular member 33 of the cable holder 31. The second elongated link EL2 may constitute the second object to be inserted into the second opening 39 of the first tubular member 33.

The first features 89 within the first and second openings 35 and 39 of the first tubular member 33 may be formed as continuous annular recesses. The second protruding ring 225 of the first elongated link EL1 is snapped into the continuous annular recess of the first opening 35 to hold, e.g., removably attach, the elongated link 217 (aka, the first object) within the first opening 35. Likewise, the first protruding ring 223 of the second elongated link EL2 is snapped into the continuous annular recess of the second opening 39 of the first tubular member 33 to hold, e.g., removably attach, the elongated link 217 (aka, the second object) within the second opening 39. This pattern may be repeated to link dozens if not hundreds of cable holders 31 together in a daisy-chain fashion.

FIG. 17 is a side view of an elongated link 227, in accordance with a second embodiment of the present invention. The elongated link 227 is generally formed as a cylindrical rod with a first end 229 and an opposite, second end 231. A first recessed ring 233 is formed into a circumference of the cylindrical rod proximate the first end 229 of the elongated link 227. A second recessed ring 235 is formed into the circumference of the cylindrical rod proximate the second end 231 of the elongated link 227.

Again, the first and second elongated links EL1 and EL2 may constitute the first and second objects to be inserted into the first and second openings 35 and 39 of the first tubular member 33 of the cable holder 31. The first and second features 89 within the first and second openings 35 and 39 of the first tubular member 33 may be formed as continuous or spaced annular protrusions. The second recessed ring 235 of the first elongated link EL1 is snapped over the continuous annular protrusion(s) of the first opening 35 to hold, e.g., removably attach, the elongated link 217 (aka, the first object) within the first opening 35. Likewise, the first recessed ring 233 of the second elongated link EL2 is snapped over the continuous or spaced annular protrusion(s) of the second opening 39 of the first tubular member 33 to hold, e.g., removably attach, the elongated link 217 (aka, the second object) within the second opening 39.

FIG. 18 is a side view of an elongated link 237, in accordance with a third embodiment of the present invention. The elongated link 237 is generally formed as a cylindrical rod with a first end 239 and an opposite, second end 241. A first through hole 243 is formed though a central axis of the cylindrical rod proximate the first end 239 of the elongated link 237. A second through hole 245 is formed through the central axis of the cylindrical rod proximate the second end 241 of the elongated link 237.

Again, the first and second elongated links EL1 and EL2 may constitute the first and second objects, however now reference will be made to the second embodiment of the cable holder 91 depicted in FIGS. 8-9. The first and second elongated links EL1 and EL2 are inserted into the first and second openings 35 and 39 of the first tubular member 93 of the cable holder 91. The first and second features 123 and 121 within the first and second openings 35 and 39 of the first tubular member 93 may both be formed as a through hole or both be formed as a slot, or formed as shown in FIG. 8.

The second through hole 245 of the first elongated link EL1 is aligned with the first feature 123 (through hole or slot) of the first opening 35. The first elongated link EL1 is rotated about its central axis until the second through hole 245 is aligned with the through holes 123 in the first opening 35 of the first tubular member 93.

Figure 21:
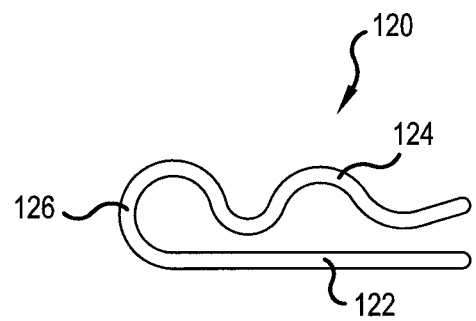
FIG. 21 is a side view of spring clip, in accordance with the prior art.

FIG. 21 shows a spring clip 120. The spring clip includes a straight, first leg 122 and a curved, second leg 124. The first leg 122 is connected to the second leg 124 by a resilient semi-circular portion 126. A first spring clip 120 is used to removably attach the first elongated link EL1 into the first opening 35 of the first tubular member 93 of the cable holder 91.

Figure 22:
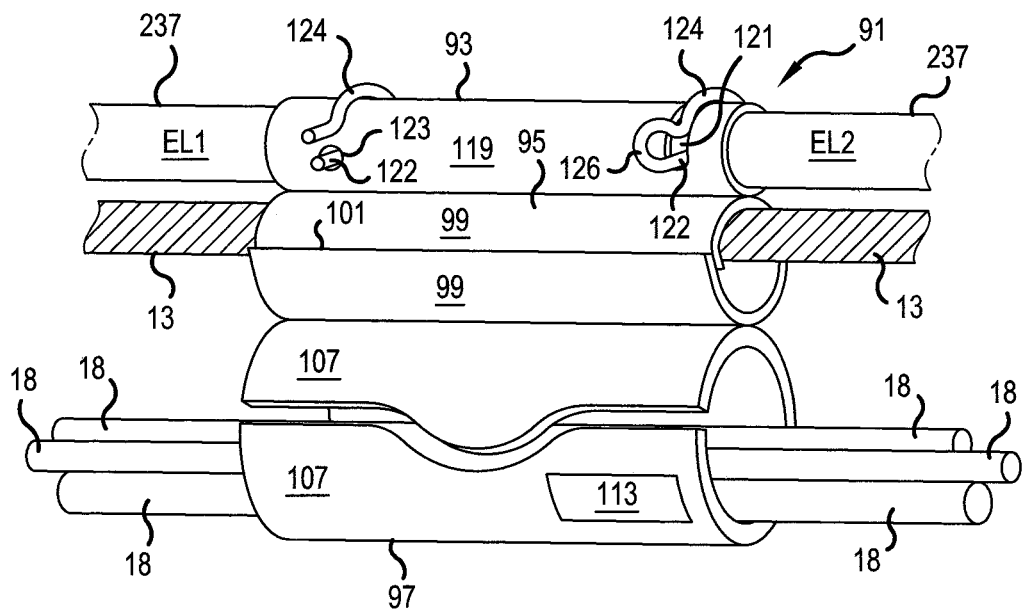
FIG. 22 is a perspective view of a cable holder similar to FIG. 8 with two elongated links of FIG. 18 attached thereto with two spring clips of FIG. 21.

As best seen in FIG. 22, the first leg 122 of the first spring clip 120 is passed through the first and second holes 123 and through the second through hole 245 of the elongated link 237. The second leg 124 of the spring clip 120 is snapped over the first tubular member 93. This arrangement holds the second end of the first elongated link EL1 within the first opening 35 of the first tubular member 93 of a cable holder 91', similar to the cable holder 91 of FIG. 8. The only differences between the cable holder 91' of FIG. 22 and the cable holder 91 of FIG. 8 is the first sidewall 119 has been made continuous between the first and second openings 35 and 39, e.g., the optional stop walls 85' between a segmented first tubular member 93 have been removed.

A second spring clip 120 is used to removably attach the second elongated link EL2 into the second opening 39 of the first tubular member 93 of the cable holder 91. After the second elongated link EL2 is inserted into the second opening 39, it is rotated about its central axis until the first through hole 243 is visible on each side of the slot 121. The first leg 121 of the second spring clip 120 is passed through the first through hole 243 of the second elongated link EL2. The second leg 124 of the spring clip 120 is snapped over the outer circumference of the second elongated link EL2 within the slot 121. This arrangement holds the first end of the second elongated link EL2 within the second opening 39 of the first tubular member 93 of the cable holder 91. FIG. 22 also illustrates the placement of the messenger wire 13 within the second tubular member 95, and the cables 18 within the third tubular member 97.

FIG. 19 is a side view of an elongated link 247, in accordance with a fourth embodiment of the present invention. The elongated link 247 is generally formed as a cylindrical rod with a first end 249 and an opposite, second end 251. A first cylindrical-shaped, lug 253 is formed on the outer circumference of the elongated link 247 proximate the first end 249. A second cylindrical-shaped, lug 255 is formed on the outer circumference of the elongated link 247 proximate the second end 251.

Again, the first and second elongated links EL1 and EL2 may constitute the first and second objects, however now reference will be made to the third embodiment of the cable holder 131 depicted in FIGS. 10-11. The first and second elongated links EL1 and EL2 are inserted into the first and second openings 35 and 39 of the first tubular member 133 of the cable holder 131. The first and second features 145 within the first and second openings 35 and 39 of the first tubular member 133 and the first and second springs 153 and 155 are used to removably attach the first and second elongated links EL1 and EL2 within the first and second opening 35 and 39.

The second lug 255 of the elongated link EL1 is aligned within the entrance track 147 within the first opening 35 of the first tubular member 133. The first spring 153 is compressed by the second end 251 of the first elongated link EL1 until the second lug 255 reaches the travel track 149, at which point the first elongated link EL1 is rotated about its central axis until the second lug 255 comes to the seating track 151. At that point, the first elongated link EL1 may be released, and the second lug 255 will seat into the seating track 151. This type of attachment is commonly referred to as a bayonet-style mounting. The second elongated link EL2 has its first lug 253 seated into the seating track 151 within the second opening 39 against the biasing force of the second spring 155 of the first tubular member 133 in the same bayonet-style.

FIG. 20 is a side view of an elongated link 257, in accordance with a fifth embodiment of the present invention. The elongated link 257 is generally formed as a cylindrical rod with a first end 259 and an opposite, second end 261. A first thread 263 is formed on the outer circumference of the elongated link 257 proximate the first end 259. A second thread 265 is formed on the outer circumference of the elongated link 257 proximate the second end 261. The first tubular member of the cable holder may include a matching threaded inner wall within the first and second openings 35 and 39. One of the first and second threads 263 and 265 may be "reverse" threaded as compared to the other. As such, rotating the elongated link 257 will cause the elongated link 257 to simultaneously tighten into both cable holders at the first and second ends 259 and 261.

Figure 23:
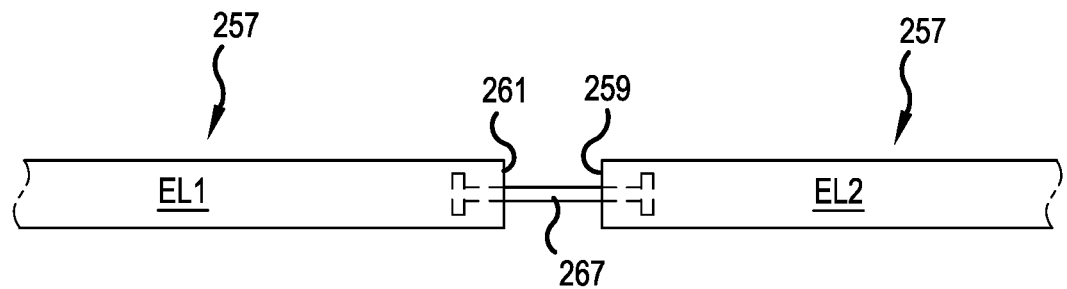
FIG. 23 is a side view of interconnected elongated links, in accordance with a sixth embodiment of the present invention.

FIG. 23 is a side view of an elongated link 257, in accordance with a sixth embodiment of the present invention. Relative to FIG. 20, the first and second threads 263 and 265 have been removed. Also, the second end 261 the first elongated link EL1 is attached to the first end 259 of the second elongated link EL2 by an elastic cord 267, e.g., a shock cord. Likewise, the second end 261 of the second elongated link EL2 would be attached to the first end 259 of the third elongated link EL3 by an elastic cord 267, and so forth, to form a daisy-chain of elongated links EL connected by elastic cords 267, such as fifty to one hundred elongated links. Such elongated links EL1, EL2, EL3, etc. are known in the art and similar to those used to form collapsible tent poles.

Figure 24:
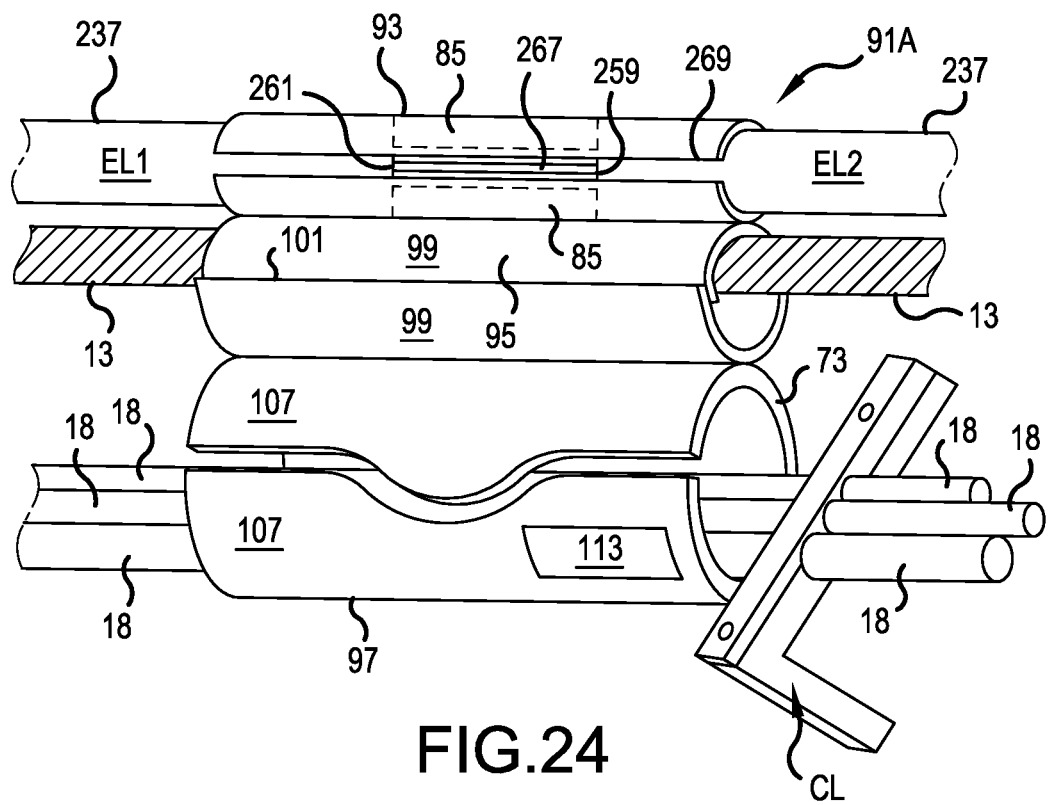
FIG. 24 is a perspective view, similar to FIG. 22, illustrating a cable holder, in accordance with a seventh embodiment, with the two elongated links of FIG. 23.

As shown in FIG. 24, the first open end 35 of the first tubular member 93 of the cable holder 91A would be connected to the second open end 39 of the first tubular member 93 by a slot 269. The slot 269 would be dimensioned to accept the elastic cord 267, so that the first and second elongated links EL1 and EL2 may be inserted into the first and second openings 35 and 39 while the elastic cord is stretched and passed through the slot 269. The stop wall 85 serves as an abutment to the first and second ends 259 and 261 of the second and first elongated links EL2 and EL1. The stop wall 85 also serves to space the first and second ends 259 and 261 apart far enough so that tension is maintained on the elastic cord 267 to pull the first and second ends 259 and 261 into tight abutment with the stop wall 85.

In the above embodiments, the tubular members have been illustrated as having a generally circular cross sectional shape. However, the cross sectional shape defined by the tubular members may be altered to be other shapes, such as an elliptical, rectangular or triangular shape. The tubular members are preferably formed of a UV-stabilized, high density polyethylene (HDPE) or medium density polyethylene (MDPE). Other materials may be used to form the tubular members, such as different polymers.

In the above embodiments, the tubular members extend in the longitudinal direction, e.g., in the along the first axis A1 for a length of between three-quarters to ten inches, like one to eight inches, more preferably about two to five inches. A diameter of the first tubular member is about ⅛ inch to about ½ inch, such as about ¼ inch to about ⅜ inch. The second tubular member is sized to easily accept the messenger wire 13, which is commonly found in diameters of ¼ inch, 5/16 inch and ⅜ inch. Therefore, the second tubular member may have a diameter of about three times the diameter of the messenger wire, such as about ½ inch to about one and a half inches, such as about ¾ inches to about 1 inch. A diameter of the third tubular member is about ¾ inch to ten inches, such about one to eight inches, more preferably about two to five inches.

In the above embodiments, the elongated links may be formed of a polymer, like HDPE, or other nonconductive materials, like a glass reinforced polymer rod (GRP). The diameter of the elongated rods is set to match, or be on slightly smaller than the diameter of the first tubular member. In other words, the diameter of the elongated links is about ⅛ inch to about ½ inch, such as about ¼ inch to about ⅜ inch. A length of the elongated links is selected to be much larger than the length of the cable holders, e.g., six to thirty times longer, such as ten to twenty times longer. For example, a length of each elongated link may be set to be about one foot to ten feet, such as two feet to nine feet, more preferably about three feet to six feet or about one to two meters.

A method of installing cable along a messenger wire includes placing a first cable holder next to an overhead messenger wire. The messenger wire is inserted into a tubular member of the first cable holder. At least one cable is inserted inside of the same tubular member or a different tubular member of the first cable holder. The cut end of the at least one cable may be attached to a clamp (CL, as shown in FIG. 24). The clamp CL prevents the at least one cable from pulling back through the tubular member, as the cable holder is pushed along the messenger wire.

A second end of a first elongated link is adjoined to the first cable holder. The first cable holder is pushed along the messenger wire using the first elongated link. A second cable holder is placed next to the overhead messenger wire. The messenger wire is inserted into a tubular member of the second cable holder. The at least one cable is inserted inside of the same tubular member or a different tubular member of the second cable holder.

A first end of the first elongated link is adjoined to the second cable holder. A second end of a second elongated link is adjoined to the second cable holder. The second cable holder, and consequentially the first cable holder, is pushed along the messenger wire using the second elongated link. During the pushing actions, the clamp CL is preventing the cable(s) from falling free of the first cable holder.

A third cable holder is placed next to the overhead messenger wire. The messenger wire is inserted into a tubular member of the third cable holder. The at least one cable is inserted inside of the same tubular member or a different tubular member of the third cable holder. A first end of the second elongated link is adjoined to the third cable holder. A second end of a third elongated link is adjoined to the third cable holder. The third cable holder, and consequentially the first and second cable holders, are pushed along the messenger wire using the third elongated link.

Figure 3:
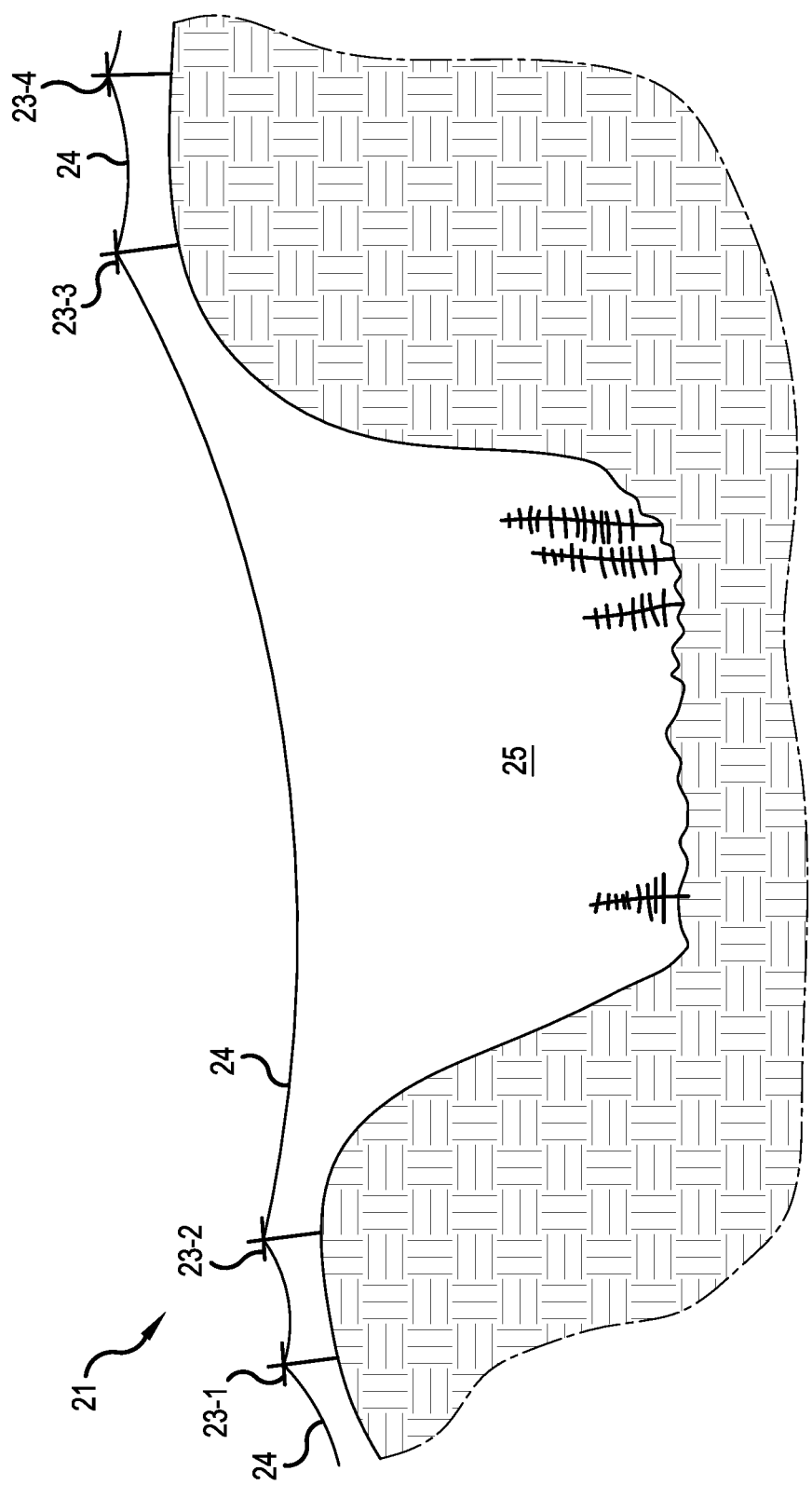
FIG. 3 is a view of an overhead cabling system, which spans across a ravine, in accordance with the prior art.
Figure 4:
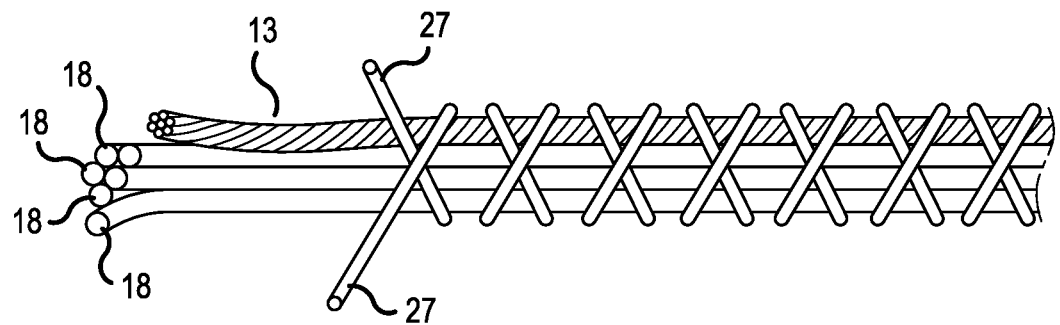
FIG. 4 is a side view of lashing wires attaching a metal, stranded, messenger wire to cables, in accordance with the prior art.
Figure 5:
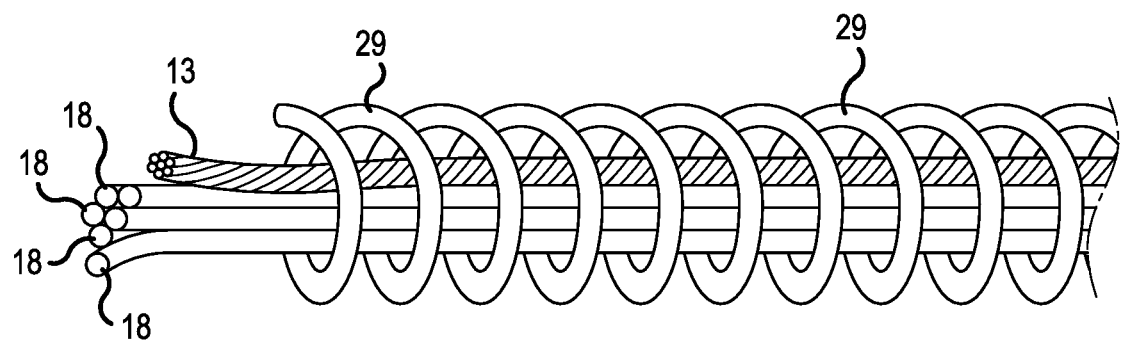
FIG. 5 is a side view of a spiral hanger holding a messenger wire and cables together, in accordance with the prior art.

This process is repeated over again and again until the first cable holder reaches its destination along the messenger wire. For example, starting at the pole 23-2 in FIG. 3, the process is repeated until the first cable holder reaches the pole 23-3. Then the clamp CL is removed from the cable(s), and the cables may be terminated, spliced, or pulled intact to further destinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A cable support comprising:
 a cable holder including:
  a first tubular member including a first opening at a first end of said first tubular member and a second opening at a second end of said first tubular member, opposite to said first end of said first tubular member, wherein said first tubular member includes a first sidewall, wherein said first tubular member includes a first feature structured to interact with a first object inserted into said first opening to hold said first object within said first opening, and wherein said first tubular member includes a second feature structured to interact with a second object inserted into said second opening to hold said second object within said second opening; and
  a second tubular member including a first opening at a first end of said second tubular member and a second opening at a second end of said second tubular member, opposite to said first end of said second tubular member, wherein said second tubular member includes a second sidewall, wherein said second tubular member is attached to said first tubular member, and wherein said second sidewall includes a first section which is open, or may be opened, to insert a cable laterally into said second tubular member through said first section.

2. The cable support according to claim 1, wherein said first tubular member generally extends along a first axis and said second tubular member generally extends along a second axis, wherein said second axis is generally parallel to said first axis, wherein said first sidewall is continuous between said first opening and said second opening, and wherein said first sidewall is attached to said second sidewall by at least one of a snap connection, a molded connection, a welded connection or an adhesive connection.

3. The cable support according to claim 1, wherein said second sidewall is formed by a first arcuate wall section and a second arcuate wall section, so that said first section is a gap between said first and second arcuate sections, and wherein said gap may be closed by one or more fasteners pulling said first and second arcuate sections into abutment to cause said second tubular member to form a closed cylinder.

4. The cable support according to claim 1, wherein said second sidewall is formed by a continuous curved wall which is shaped like a cylinder with a gap connecting said first opening at said first end of said second tubular member to said second opening at said second end of said second tubular member.

5. The cable support according to claim 4, wherein said gap follows a serpentine path from said first end of the second tubular member to said second end of the second tubular member.

6. The cable support according to claim 1, wherein said cable holder includes:
 a third tubular member including a first opening at a first end of said third tubular member and a second opening at a second end of said third tubular member, opposite to said first end of said third tubular member, wherein said third tubular member includes a third sidewall, wherein said third tubular member is attached to at least one of said first and second tubular members, and wherein said third sidewall includes a second section which is open, or may be opened, to insert a cable laterally into said third tubular member through said second section.

7. The cable support according to claim 6, wherein said second sidewall is formed by a continuous curved wall which is shaped like a cylinder with a first gap connecting said first opening at said first end of said second tubular member to said second opening at said second end of said second tubular member; and wherein said third sidewall is formed by a continuous curved wall which is shaped like a cylinder with a second gap connecting said first opening at said first end of said third tubular member to said second opening at said second end of said third tubular member.

8. The cable support according to claim 6, wherein said second and third tubular members have a generally circular cross sectional shape.

9. The cable support according to claim 1, wherein a cross sectional shape defined by said second tubular member is selected from circular, elliptical, rectangular or triangular.

10. The cable support according to claim 1, further comprising:
a labeling area formed on said second tubular member and dimensioned to accept and hold a label to identify a cable or cables held within said second tubular member.

11. A cable support comprising:
a first cable holder including:
a first tubular member including a first opening at a first end of said first tubular member and a second opening at a second end of said first tubular member, opposite to said first end of said first tubular member, wherein said first tubular member includes a first sidewall, wherein said first tubular member includes a first feature structured to interact with a first object inserted into said first opening to hold said first object within said first opening, and wherein said first tubular member includes a second feature structured to interact with a second object inserted into said second opening to hold said second object within said second opening; and
a second tubular member including a first opening at a first end of said second tubular member and a second opening at a second end of said second tubular member, opposite to said first end of said second tubular member, wherein said second tubular member includes a second sidewall, wherein said second tubular member is attached to said first tubular member, and wherein said second sidewall includes a first section which is open, or may be opened, to insert a cable laterally into said second tubular member through said first section;
a first elongated link constituting said first object, said first elongated link having a first end and an opposite second end, said first end residing within said first opening of said first tubular member, said first elongated link further including a first portion engaged by said first feature of said first tubular member; and
a second elongated link constituting said second object, said second elongated link having a first end and an opposite second end, said second end residing within said second opening of said first tubular member, said second elongated link further including a second portion engaged by said second feature of said first tubular member.

12. The cable support according to claim 11, further comprising:
a second cable holder including:
a first tubular member including a first opening at a first end of said first tubular member and a second opening at a second end of said first tubular member, opposite to said first end of said first tubular member, wherein said first tubular member includes a first sidewall, wherein said first tubular member includes a first feature structured to interact with a first object inserted into said first opening to hold said first object within said first opening, and wherein said first tubular member includes a second feature structured to interact with a second object inserted into said second opening to hold said second object within said second opening; and
a second tubular member including a first opening at a first end of said second tubular member and a second opening at a second end of said second tubular member, opposite to said first end of said second tubular member, wherein said second tubular member includes a second sidewall, wherein said second tubular member is attached to said first tubular member, and wherein said second sidewall includes a first section which is open, or may be opened, to insert a cable laterally into said second tubular member through said first section, wherein said first end of said second elongated link resides within said first opening of said first tubular member of said second cable holder, said second elongated link further including a first portion engaged by said first feature of said first tubular member of said second cable holder.

13. The cable support according to claim 11, wherein said first elongated link is formed as a cylindrical rod.

14. The cable support according to claim 11, wherein said first portion of said first elongated link is formed by a recessed area and said first feature of said first tubular member is formed by a protrusion adapted to enter said recessed area of said first elongated link.

15. The cable support according to claim 14, wherein said protrusion is adapted to be manually released from said recessed area to permit said first elongated link to be removed from said first opening of said first tubular member.

16. The cable support according to claim 11, wherein said first portion of said first elongated link is formed by a protruding area and said first feature of said first tubular member is formed by a recessed area adapted to receive said protruding area of said first elongated link.

17. The cable support according to claim 11, wherein said first portion of said first elongated link is formed by a first through hole and said first feature of said first tubular member is formed by an open slot, and further comprising:
a spring clip, wherein said spring clip includes a first leg passing through said first through hole and a second leg snapped over an outer circumference of said first elongated link and also residing within said open slot of said first tubular member.

18. The cable support according to claim 11, wherein said first portion of said first elongated link is formed by a first through hole passing through said first elongated link and said first feature of said first tubular member is formed by aligned second holes passing through said first sidewall proximate said first opening of said first tubular member, and further comprising:
a spring clip, wherein said spring clip includes a first leg passing through said first and second holes and a second leg snapped over said first tubular member to hold said first end of said first elongated link within said first opening of said first tubular member.

19. The cable support according to claim 11, wherein said first portion of said first elongated link is formed by a lug extending away from an outer surface of said first elongated linkage, and wherein said first feature of said first tubular member is formed by tracks within with an inner sidewall of said first opening of said first tubular member, wherein said first end of said first elongated link is held within said first opening of said first tubular member by a bayonet engagement of said first lug within said tracks.

* * * * *